E. SCHILDBACH.
FISHING APPLIANCE.
APPLICATION FILED NOV. 16, 1908.
916,891.
Patented Mar. 30, 1909.
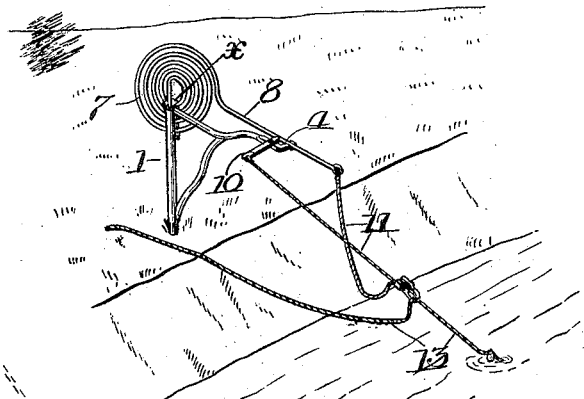
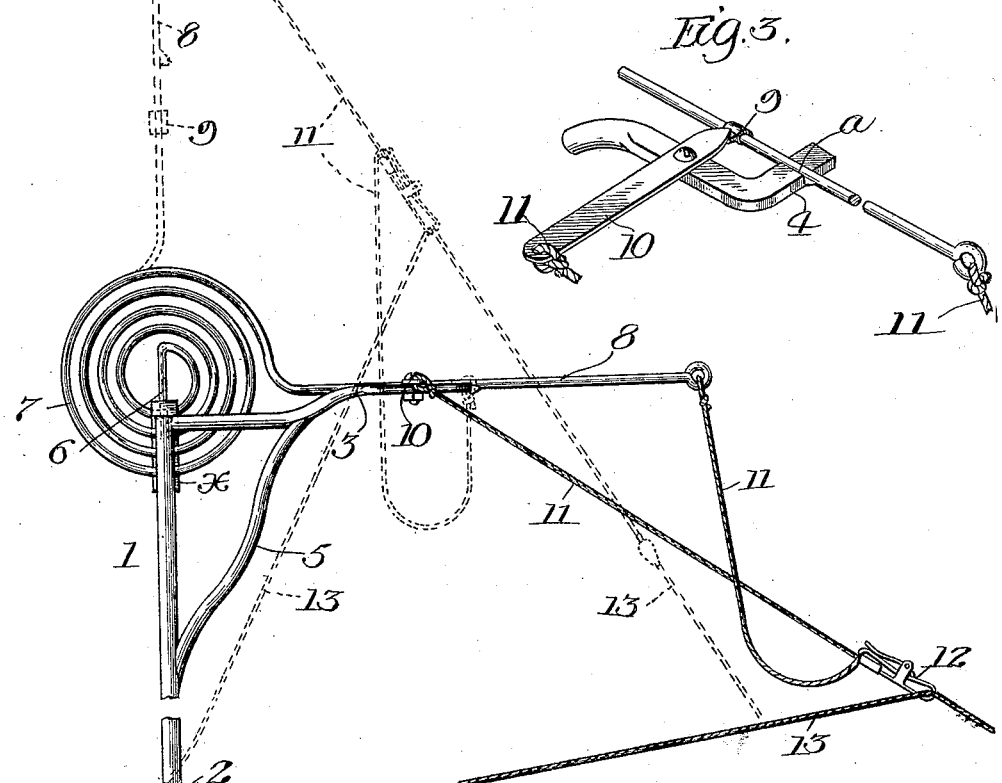
Witnesses
Inventor
Ernest Schildbach
by Frank D. Thomason
Atty

UNITED STATES PATENT OFFICE.

ERNEST SCHILDBACH, OF ELMHURST, ILLINOIS.

FISHING APPLIANCE.

No. 916,891.  Specification of Letters Patent.  Patented March 30, 1909.

Application filed November 16, 1908. Serial No. 462,790.

*To all whom it may concern:*

Be it known that I, ERNEST SCHILDBACH, a citizen of the United States, and a resident of Elmhurst, in Dupage county and State of Illinois, have invented certain new and useful Improvements in Fishing Appliances, of which the following is a clear, full, and exact description.

My invention relates to suitable appliances for automatically catching fish by means of a hook and line, and its object is to provide a device that is so cheap to make that it may be sold for a very nominal sum and on account of its simple construction, will not readily get out of order.

It is also an object of my invention to construct an automatic fishing appliance that will be efficient and reliable, and one that will operate more positively and accurately than those heretofore in use.

These objects I accomplish by the means hereinafter fully described and as more particularly pointed out in the claims.

In the drawings: Figure 1 is a perspective view showing my improved fishing appliance in use on the bank of a stream. Fig. 2 is a vertical side elevation of my invention showing the same drawn to a larger scale. Fig. 3 is an enlarged detail view of the latch or trigger used in connection with my invention together with some of the adjacent portions of the device.

My improved fishing appliance, as will readily be seen from the drawings, is adapted to be placed near to or at the edge of the bank of a stream where it is desired to fish, and it comprises a suitable supporting frame 1, one portion of which is formed into a vertically disposed standard or pole 2. The lower end of this pole is preferably tapered or pointed as shown, so as to facilitate the same being pushed or driven into the ground a suitable distance to firmly hold it in an upright position, while the upper portion of said standard is preferably provided with a lateral irregularly-shaped bracket 3 projecting at substantially right angles therefrom. The outer end 4 of this bracket is deflected or bent at right angles to itself and the upper surface thereof is provided with a shallow recess $a$ that forms a seat for the straightened end of the helically coiled spring and prevents any accidental lateral movement thereof, as will hereinafter more fully appear. A brace or slanting tie-rod 5 connects this horizontal bracket to the standard at about midway their lengths and all of said parts are formed or cast in one piece of metal with each other.

The helically-coiled spring 7 before referred to is mounted on the upper end of the standard 2 and in order to securely hold this spring in place the end 6 of the inner coil is straightened or bent outwardly from the center so as to project across said spring in a radial direction from its center and is then inserted in an opening bored in the end of said standard. A suitable retaining yoke $x$ is secured to the upper portion of said standard and passes outside of the lower segments of the spring to prevent any lateral movement thereof. This spring may be of either flat or round wire as desired and it has the end of its outer coil preferably straightened or bent radially outward away from itself to form a spring arm 8 about a foot in length which, in its normal position, projects upwardly in a vertical direction as shown. The upper end of said spring arm is formed into a suitable eye and near its lower end has a lug or stop 9 projecting therefrom that is adapted to be engaged by the end of a pivoted latch or trigger 10 mounted horizontally on bracket 3 of the supporting frame. This trigger is mounted near one end on a pivot pin or bolt tapped through said bracket and it is so arranged that one end will extend out from the bracket to form an operating lever and when the spring arm 8 is brought downward under tension and is seated in recess $a$ of the bracket arm, the lug 9 on said spring will engage the shorter end of the trigger. A suitable flexible cord, or chain 11 (of greater length than the distance between the end of the arm and the longer end of the trigger) connects these two members and at about midway the length thereof a suitable spring clamp or clasp 12 is secured. The fishing line 13 is adapted to be held between the jaws of this clamp at a suitable distance above the float or "bob", while the remaining portion of said line is left on the river bank.

The operation is as follows:—When it is desired to set the appliance, the fishing line is adjusted in the clamp and the remainder thereof left on the bank as just described. The spring arm 8 is then forced downward until it has become seated in the recess $a$ on the end of the bracket, and then the trigger is set to engage lug 9. The baited end of the fishing line is then thrown into the water and it will be found that the portion of the cord or chain 11 between the clasp and the trigger will become taut while that portion connecting the clasp and the end of the spring arm will become slack. As soon as a fish has started to nibble the bait any slight pull given to the baited end of the line will release the trigger from lug 9 and the spring arm will fly up bringing its end of the cord or chain 11 taut and thereby giving to the fishing line a sudden jerk sufficient to hook the fish at the end thereof. The line can then be drawn in and the fish removed. In adjusting the clamp on the cord or chain it will be seen that it is essential to allow enough slack on the portion secured to the spring arm to permit the same to give the fishing line the sudden jerk necessary to insure the hooking of the fish.

While I have described certain specific means for carrying out my invention, it of course will be understood I do not desire to be limited to that particular construction as obvious changes may be made without materially departing from the spirit of my invention.

What I claim as new is:—

1. A fishing appliance comprising a helical spring having the end of its outer coil deflected laterally therefrom, a device for holding said deflected portion under tension and releasing the same, and a flexible connection between the outer end of said deflected portion and said device to which a fishing line may be secured.

2. A fishing appliance comprising a helical spring, an arm actuated thereby, a device for holding said arm under tension and releasing the same, a flexible connection between the outer end of said arm and said holding and releasing device, and means secured to said connection for securing a fishing line thereto.

3. A fishing appliance comprising a helical spring the end of the outer coil of which is bent radially, a trigger for temporarily holding said deflected portion under tension, a flexible connection between the outer end of said deflected portion and said trigger and means attached to said connection for securing a fish-line thereto.

4. A fishing appliance comprising a helical spring the end of the outer coil of which is bent radially, a trigger for temporarily holding said deflected portion under tension, a cord having one end secured to said deflected portion and the opposite end secured to said trigger, and a clasp attached to said cord mediate its ends to which a fish-line may be secured.

5. A fishing appliance comprising a suitable frame having a vertical standard, a bracket projecting at substantially right angles therefrom, a helical spring mounted on said standard and having one of its ends straightened and projecting in a vertical direction, a trigger on said bracket for temporarily holding the straightened portion of said spring under tension, and a flexible connection between the deflected portion of said spring and trigger to which a fish line may be secured.

6. A fishing appliance comprising a suitable frame having a vertical standard, a bracket projecting at substantially right angles therefrom, a helical spring mounted on said standard having the end of its outer coil straightened and normally projecting in a vertical direction, a trigger on said bracket for temporarily holding said spring under tension, and a cord connecting the free end of said spring and said trigger, and a clasp attached to said cord mediate its ends to which a fish-line may be secured.

7. A fishing appliance comprising a suitable spring, an arm projecting therefrom normally in an upright position, a supporting frame for said spring having a bracket projecting laterally therefrom that is provided with a recess in which said arm is adapted to be seated when moved to a horizontal position, means for temporarily retaining said spring in a horizontal position, and a flexible connection between the outer end of said arm and said retaining means to which a fish line may be attached.

8. A fishing appliance comprising a suitable spring, an arm projecting therefrom normally in an upright position, a supporting frame for said spring having a bracket projecting laterally therefrom that is provided with a recess in which said arm is adapted to be seated when moved to a horizontal position, a trigger for temporarily retaining said spring in a horizontal position, and a cord connecting the outer end of said arm and trigger, and a clamp secured to said cord mediate its ends to which a fish line may be attached.

In testimony whereof I have hereunto set my hand and seal this 15th day of August, A. D., 1908.

ERNEST SCHILDBACH. [L. S.]

Witnesses:
E. K. LUNDY,
M. E. MARTIN.